United States Patent [19]

Colombier et al.

[11] Patent Number: 5,010,158

[45] Date of Patent: Apr. 23, 1991

[54] PROCESS FOR PREPARING POLYSILOXAZANE COMPOSITIONS AND THE PRODUCTS FORMED THEREBY

[75] Inventors: Christian Colombier, Lyon; Jean-Pierre Cuer, Francheville le Haut, both of France

[73] Assignee: Atochem, Puteaux, France

[21] Appl. No.: 289,645

[22] Filed: Dec. 23, 1988

[30] Foreign Application Priority Data

Dec. 28, 1987 [FR] France .................. 87 18215

[51] Int. Cl.$^5$ .................................. C08G 77/04
[52] U.S. Cl. ......................... 528/28; 501/92; 501/97
[58] Field of Search ............... 528/28; 501/92, 97

[56] References Cited

U.S. PATENT DOCUMENTS 3,853,567 12/1974 Verbeek .................. 106/44
4,612,383 9/1986 Laine et al. .............. 556/412
4,788,309 11/1988 Laine et al. .............. 528/15

FOREIGN PATENT DOCUMENTS 0237199 9/1987 European Pat. Off. .
WO86/06377 11/1986 PCT Int'l Appl. .

Primary Examiner—Melvyn I. Marquis
Attorney, Agent, or Firm—Pennie & Edmonds

[57] ABSTRACT

A process for the preparation of novel polysiloxazane compositions which comprises reacting at least one halosilane having the formula $(R_1)_a (R_2)_b Si(Y)_{4-(a+b)}$ with at least one hydrazine having the formula $NHR_3$-$NHR_4$ and water, wherein $R_1$ and $R_2$ are a hydrogen atom or a methyl, ethyl, vinyl or phenyl radical; $R_3$ and $R_4$ are hydrogen atoms, Y is a halogen atom and (a+b) is an integer between 0 and 3 and preferably 2. Polysiloxazane polymer compositions formed with polysiloxazanes prepared by the process described above comprise units of formula:

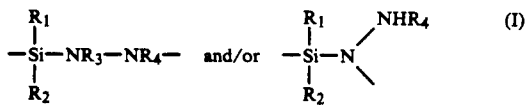

combined with units of formula:

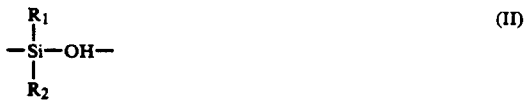

and, if desired, units of formula:

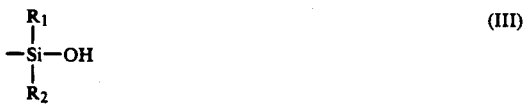

and, if desired, with units of formula:

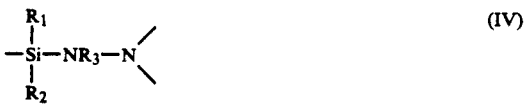

wherein radicals $R_1$, $R_2$, $R_3$ and $R_4$, which may be identical or different, may denote a hydrogen atom, a saturated or unsaturated aliphatic hydrocarbon radical or a mono- or polycyclic aryl, alkylaryl or arylalkyl radical, and wherein these radicals have a total molecular mass greater than 350.

21 Claims, No Drawings

PROCESS FOR PREPARING POLYSILOXAZANE COMPOSITIONS AND THE PRODUCTS FORMED THEREBY

TECHNICAL FIELD

The present invention relates to novel polysiloxazane compositions, to a process for their preparation, and to various applications for these materials, especially as precursors of ceramics and to the ceramics resulting from the pyrolysis of these compounds.

BACKGROUND OF THE INVENTION

THE TERMS polysilazanes, organopolysilazanes, silazane polymers or carbosilazane resins, as they are encountered in the literature, are generally employed to denote solid or more or less viscous liquid polymeric substances containing a plurality of —NR—Si— units. The term polysiloxazane is preferably employed when the macromolecular chain also contains oxygen. Such polymeric substances may be shaped and converted by pyrolysis into articles which are usually referred to as ceramics, containing silicon, nitrogen and carbon and, if appropriate, oxygen. In most cases, the oxygen is present in the form of silicon carbide, nitrides or carbonitrides.

Various techniques have been proposed in the prior art for preparing the above-mentioned polysilazanes. For example, U.S. Pat. No. 3,853,567 to Verbeek discloses the reaction of a halosilane with an amine. According to the Verbeek reference, the halosilane may be chosen from various silanes which are mono- or poly-substituted with halogen atoms, preferably chlorine, since it is possible for any free silicon valences to be substituted for by alkyl or aryl groups. As for the amines, these may be chosen from compounds bearing one or more $NH_2$ or NH groups since it is possible for these compounds to be, for example, primary or secondary amines, amides, hydrazines or hydrazides or, in the case of halosilanes containing carbon, ammonia. It should be noted that, in the Verbeek reference, the organic bases preferably employed do not contain an oxygen atom. Most preferable are the compounds consisting solely of nitrogen and hydrogen, such as ammonia. Moreover, the use of anhydrous ammonia is also recommended in U.S. Pat. No. 4,482,669.

The above-described reaction of a halosilane with a compound consisting solely of nitrogen and hydrogen and optionally, carbon, has been carried out, according to the literature in this field, in both the vapor phase and in solvent mediums (see, e.g., U.S. Pat. Nos. 4,397,828, col. 1, lines 23-26 and lines 49-53; 2,564,674 and 3,853,567, which was referred to above).

Moreover, it is known that a problem which occurs during the preparation of polysilazanes concerns controlling the viscosity, the molecular mass and the structure of these polymers. The technique proposed by Verbeek, for example, does not always make it possible to ensure that these factors are adequately controlled (see, also, U.S. Pat. No. 4,310,651). French Pat. nos. 2,584,080 and 2,584,079 and U.S. Pat. No. 4,482,669 propose catalytic or thermal treatments of chlorosilane ammonolysates, so as to increase the viscosity of the silazane and also the yield of the inorganic product obtained when the silazane is pyrolysed.

Additional references describe the syntheses of a ceramic substance containing a major proportion of silicon oxynitride formed by the pyrolysis of an organometallic precursor. In particular, European Pat. no. 167,230 discloses how an optimum content of oxygen in the ceramic makes it possible to inhibit crystallization therein and hence to improve the mechanical properties of this material at high temperatures (i.e., 1200° C. and above). Furthermore, European Pat. nos. 161,828, 181,208 and 162,596 also illustrate the advantages of partially oxidized ceramics.

Another advantage of such partially oxidized ceramics is that they possess an improved resistance to oxidation by air at high temperature. In the patents described above, the introduction of oxygen into the precursor is performed by adding an oxide powder, for example silica, or by the action of moist air on the precursor once it has been shaped. This latter treatment is intended to produce a crosslinking upon the surface of the article so as to endow it with stiffness in the desired form before pyrolysis.

While the siloxazane group has been known for a long time, these are chiefly products produced by the ammonolysis and hydrolysis of chlorosilanes. Recently, it has been proposed, i.e., by Yuan-Fu Yu and Tai Il Mahin *Mat. Res. Soc. Sym. Proc.* vol. 73, 1986, pps. 559-65 to use a siloxazane obtained by catalytic "hybridization" of a mixture of siloxanes and of silazanes as precursors of a partially oxidized silicious ceramic, for example $Si_2N_2O$.

Furthermore, Wannagat, in *Z. Anorg. Allg. Chem.* 1971, 385(3), 261-70, has described the synthesis of molecules containing both —Si—O— and —Si—N—N— chains. However, these molecules were produced by the coreaction of mixtures of $ClMe_2SiN$-$MeSiMe_2Cl$ and of $ClMe_2SiOSiMe_2Cl$ with hydrazine or methylhydrazine. These molecules, of low molecular weight (i.e., <350) have, furthermore, never been proposed as ceramic precursors.

SUMMARY OF THE INVENTION

The present invention describes novel polysiloxazane compositions which can be pyrolysed to a ceramic containing silicon, nitrogen, oxygen and, if desired, carbon at a temperature of at least 700° C.

Another object of the invention relates to a technique for preparing polysiloxazane compositions which makes it possible to efficiently control the viscosity of the polysiloxazanes.

Another object of the invention relates to a technique for the preparation of ceramics which makes it possible to efficiently control the composition of the ceramic, particularly its oxygen content.

Another object of the invention relates to a technique leading, via pyrolysis, to a high yield of ceramic, which is sometimes referred to as an inorganic product.

Other advantages of the invention will become apparent on reading the description which follows.

DETAILED DESCRIPTION OF THE PREFERRED EMBODIMENTS

The present invention relates, therefore, firstly to polysiloxazane polymers, these polymers are characterized in that they comprise units having the formula:

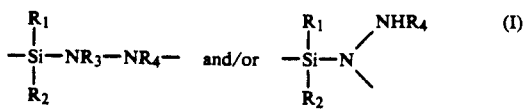

combined with units of formula:

 (II)

and, if desired, units of formula:

 (III)

and, if desired, with units of formula:

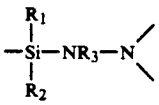 (IV)

in which formulae the radicals $R_1$, $R_2$, $R_3$ and $R_4$, which may be identical or different, may denote a hydrogen atom, a saturated or unsaturated aliphatic hydrocarbon radical or a mono- or polycyclic aryl, alkylaryl or arylalkyi radical, and wherein the polysiloxazane has a total molecular mass greater than 350, with the proviso that $R_1$ and $R_2$ may not denote simultaneously a hydrogen atom.

The present invention relates more particularly to polysiloxazanes consisting of the units indicated above and having an average molecular mass between about 400 and 50,000, and preferably between about 400 and 10,000.

The invention also relates to a process for the preparation of polysiloxazanes containing unit I and unit II and/or III and, if desired, IV, wherein the process comprises reacting:

at least one halosilane of formula:

$(R_1)_a(R_2)_b Si(Y)_{4-(a+b)}$;  (V)

with at least one hydrazine of formula:

$NHR_3$—$NHR_4$; and  (VI)

water
in which formulae the symbols $R_1$, $R_2$, $R_3$ and $R_4$ have the meanings given above, Y denotes a halogen atom, especially chlorine and (a+b) denotes an integer between 0 and 3 inclusive and preferably approximately 2.

The invention also relates to ceramic shaped articles which may be obtained after shaping and pyrolysing the above-mentioned polysiloxazanes. These articles, which may be in the form of fibres, filaments, powders, films, coverings, flakes, coatings, foams or woven or nonwoven articles or composite materials derived therefrom, may be converted to a ceramic by heating the polysiloxazanes described above to a temperature of at least about 700° C. As a general rule, these ceramic articles contain the following proportions of elements (by weight):

30 to 70% silicon;
2 to 30% nitrogen;
1 to 25% oxygen; and
0 to 35% carbon.

By way of specific examples of the radicals denoted by the symbols $R_1$, $R_2$, $R_3$ and $R_4$ in the above formulae,
there may be particularly mentioned, in addition to hydrogen, saturated aliphatic hydrocarbon radicals containing from 1 to 8 carbon atoms, such as methyl, ethyl, propyl, butyl, pentyl, hexyl, heptyl or octyl radicals, unsaturated radicals such as vinyl or allyl, alicyclic radicals containing from 3 to 7 carbon atoms, such as cyclopropyl, cyclobutyl, cyclopentyl, cyclohexyl or cycloheptyl radicals, or phenyl, benzyl, phenylethyl, tolyl, xylyl or naphthyl radicals.

The $R_1$ and $R_2$ radicals preferably denote hydrogen or methyl, ethyl, vinyl or phenyl radicals, while the $R_3$ and $R_4$ radicals denote hydrogen.

By way of specific examples of the halosilanes of formula V, the products corresponding to the following formulae are preferred for use in the invention:

$SiCl_4$, $(CH_3)_2SiCl_2$, $(CH_3)_3SiCl$, $CH_3SiCl_3$, $(C_6H_5)_2SiCl_2$, $(C_6H_5)(CH_3)SiCl_2$, $(C_6H_5)SiCl_3$, $(CH_3)(CH_3CH_2)SiCl_2$, $H_2SiCl_2$, $(CH_3)_2HSiCl$, $HSiCl_3$, $CH_3(CH_2=CH)SiCl_2$, $(CH_3)_2(CH_2=CH)SiCl$ and $(CH_3)HSiCl_2$.

It follows then, from the preferred value given for (a+b) that one or more dihalosilanes or a mixture containing one or more dihalosilanes and a mono- or a trihalosilane and/or $SiCl_4$ is advantageously employed in the invention. The percentage of chlorine atoms contributed by the trihalosilane in the mixture with the dihalosilane preferably does not exceed 70%. In the case of a monohalosilane or of $SiCl_4$, this percentage preferably does not exceed 30%.

By way of specific examples of the hydrazines of formula VI there will be mentioned in particular unsubstituted hydrazine (i.e., $N_2H_4$), methylhydrazine, ethylhydrazine, phenylhydrazine, cyclohexylhydrazine, 1,2-dimethylhydrazine, 1,2-diethylhydrazine, 1,2-diphenylhydrazine, 1,2-dibenzylhydrazine, α-naphthylhydrazine, 1,2-diiso-propylhydrazine, 1,2-ditolylhydrazines, 1,2-diisobutyl- hydrazine, (2,3-dimethylphenyl)hydrazine and 1,2-di(α-naphthyl)hydrazine.

A mixture comprising a number of hydrazines and especially a number of the compositions referred to specifically above may be employed in the invention. Hydrazine, i.e., $N_2H_4$, may also be advantageously employed alone.

In implementing the process of the present invention, use is advantageously made of hydrazine (VI) and water in quantities such that the number of moles of water added to the number of moles of hydrazine is greater than the number of moles of halogen (Y) added to the number of moles of silicon. This excess may, for example, amount to about 20%. Moreover, it is desirable to employ a number of moles of water which is smaller than one half of the number of moles of silicon. The above-mentioned reaction is advantageously carried out in the presence of a tertiary amine such as triethylamine, trimethylamine, triphenylamine or pyridine. The chief role of this amine is to limit the formation of hydrazine hydrohalide by forming a hydrohalide derivative of the amine.

As a general rule, the amine is present in at least one molecule per atom of halogen. Moreover, it is even preferable to exceed this ratio, typically by about 20%. When an amine is employed, the moles of hydrazine which are added to the moles of water may be greater than the moles of silicon atoms alone. On this same assumption, 0.05 to 1 mole of water will be advantageously employed per mole of hydrazine (VI).

If an excess (as defined above) of halosilane is employed, it is advantageous, after having reacted the hydrazine, the water and the halosilane(s) to add to the reaction product an excess of a reactant enabling the halosilane to be removed from the final product. As a general rule, this reactant may be, for example, an amine or ammonia.

Water may be introduced in various ways: it may be present in the form of hydrazine hydrate or it may be mixed with anhydrous hydrazine before the reaction. Lastly, it may be introduced apart from the hydrazine, simultaneously with the hydrazine or otherwise.

The presently described process is advantageously carried out in an inert atmosphere, for example, under a stream of nitrogen. The reaction temperature is maintained generally between −10° and 100° C. The above-mentioned reactants, i.e., halosilane, hydrazine and water, may be employed by themselves, the tertiary amine being added if appropriate. A solvent for the final polysiloxazane may preferably be resorted to, and this may be chosen from, optionally, halogenated aliphatic or aromatic hydrocarbons such as toluene, methylene chloride, benzene, xylene and hexane, or ethers such as isopropyl ether and diethyl ether. Further, the reaction may be carried out at atmospheric pressure, which is preferred, or under a positive or reduced pressure.

The reaction may be permitted to proceed for a period of from a few tens of minutes to a few hours. Upon completion, the hydrohalides are removed, for example by filtration under reduced pressure or under nitrogen pressure, and any remaining solvent and the excess hydrazine or tertiary amine are removed, for example by evaporation under reduced pressure. The polysiloxazanes produced in accordance with the invention are thus collected in the form of rigid or resinous solids or in a more or less viscous oil, depending upon the percentage of units having formula II or III.

The polysiloxazanes may then be shaped, if desired, after heating them to a temperature between approximately 25° C. and 300° C. This shaping may be done, for example, by extruding the material through dies of appropriate dimensions to obtain filaments having a diameter which may be between 1 and 50 μm, or by rolling the polymer to form a film whose thickness may range from about 10 to 100 μm.

Coatings may also be formed starting with polysiloxazane solutions on substrates such as metals (metallic silicon, steel, nickel-rich alloys) or ceramics. It is possible for the thickness of these coatings to be, for example, of the order of about 0.5 to 100 μm. In the case where the coating contains an additive such as silicon carbide or nitride powders, this thickness may reach several millimeters.

The shaped polysiloxazanes are then pyrolysed by heating them to a temperature of about 700° or above, for example up to 1400° C., so as to produce a ceramic containing silicon, nitrogen, oxygen and, if desired, carbon. The pyrolysis step may be carried out in a neutral atmosphere, that is to say under nitrogen or argon, or in an ammonia atmosphere if it is intended to reduce or even eliminate the carbon content of the ceramic.

Thus, the polysiloxazanes produced in accordance with the present invention may be obtained in high yields and may themselves be utilized for the production of ceramics in yields which can attain or even exceed 50%. The presently disclosed process for preparing these polysiloxazanes makes it possible to control the content of units having the formulae II and III in the products, and consequently, the oxygen content of the ceramic resulting from the pyrolysis of these precursors.

EXAMPLES

In the present examples, the ceramic yields, i.e., which are determined by the weight of ceramic obtained/weight of precursor used × 100, have been measured by thermogravimetric analysis without confinement and under a nitrogen sweep. The temperature rise was 100° C./hour which was followed by a plateau of one hour at 1000° C., i.e., the maximum temperature.

In Examples 1 to 3, the ratio of the number of moles of water to the number of moles of hydrazine is 0.4, 0.167 and 0 respectively. The sum of the number of moles of water and of moles of hydrazine remains constant and equal to 1.4. The relative number of units (I) and (II) has thus been varied while the same quantity of chlorosilane (1 mole) has been employed.

EXAMPLE 1

The reaction was carried out in a jacketed reactor fitted with a thermometer, a stirring system, a condenser (15° C.) and a nitrogen inlet. After the reactor was purged with nitrogen, 600 ml of toluene, 3 moles of triethylamine and 1 mole of $CH_3SiHCl_2$ are poured into it at 15° C. While the reactor is being stirred and cooled with water at 15° C., a mixture containing 1 mole of hydrazine and 0.4 mole of water is poured into it at a constant rate over 30 minutes. After this addition, the reactor temperature is taken to 60° C. for 6 hours and, lastly, with gentle stirring, to 15° C. for 15 hours. The precipitate is removed by filtration under nitrogen pressure and the remaining clear solution is collected. The solvent and the remaining volatile reactants are removed with the aid of a rotary evaporator at 60° C. under a pressure which is gradually reduced from 150 mm of mercury to 0.5 mm of mercury at the end of the evaporation. 56 g of a viscous oil are finally recovered, which corresponds to a theoretical yield of 82% based on the structure of units (I) and (II).

The precipitate is then dried under nitrogen at 60° C. in an oven at a reduced pressure of 50 mm of mercury. A weight of 240.6 g is determined by weighing, which corresponds to a theoretical yield of 87.5%, based on the form of the triethylamine hydrochloride used.

Infrared analysis of the precipitate confirms that it is triethylamine hydrochloride.

The polysiloxazane obtained contains a plurality of units of formulae:

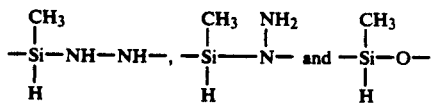

Infrared analysis agrees with the proposed structures: 3358 cm$^{-1}$: ($\nu$NH), 3265.1 cm$^{-1}$ ($\nu$NH$_2$), 2963.7 cm$^{-1}$ and 2904.7 cm$^{-1}$ ($\nu$CH), 2160.9 cm$^{-1}$ ($\nu$SiH), 1583.9 cm$^{-1}$ ($\delta$NH$_2$), 1406.1 cm$^{-1}$ ($\delta$CH$_3$), 1258.6 cm$^{-1}$ ($\delta$SiCH$_3$). It is seen, in particular, that the $\nu$Si-N and $\nu$Si-O bands overlap to give a broad band from 950 to 1200 cm$^{-1}$ with a maximum at 1047 cm−1.

Other bands: 880 cm

This polysiloxazane has an average molecular mass of approximately 1000.

A ceramic yield of 62% is determined by thermogravimetric analysis. The ceramic contains, by weight:
approximately 51.2% silicon;
approximately 19.1% nitrogen;
approximately 14% carbon; and
approximately 15.3% oxygen.

EXAMPLE 2

The procedure is followed exactly as described in Example 1, but utilizes a mixture containing 1.2 moles of hydrazine and 0.2 mole of water. 54.3 g of a viscous oil are collected (theoretical yield=76.3%). The dried precipitate has a mass of 225.6 g (theoretical yield=82%). On the infrared spectrum the $\nu$Si-N and $\nu$Si-O bands overlap to give a broad band from 950 to 1200 cm$^{-1}$ with a maximum at 1025 cm$^{-1}$. The $\nu$Si-H band has a maximum at 2154 cm$^{-1}$. This polysiloxazane has an average molecular mass of approximately 1000.

A ceramic yield of 61% is determined by thermogravimetric analysis.
The ceramic contains, by weight:
approximately 52.5% silicon;
approximately 26.6% nitrogen;
approximately 13.6% carbon; and
approximately 5.8% oxygen.

EXAMPLE 3 (Comparative)

The procedure is followed exactly as described in Examples 1 and 2 but with 1.4 moles of hydrazine and in the absence of water. 56 g of a resinous product (theoretical yield approximately 75.7%) and 225 g of precipitate (theoretical yield approximately 81.8%) were collected.

The infrared spectrum of the polysilazane shows a fairly narrow $\nu$SiN band from 950 to 1100 cm$^{-1}$ with a maximum at 988 cm$^{-1}$. The $\nu$SiH band exhibits a maximum at 2125 cm$^{-1}$. This polysilazane has an average molecular mass of approximately 1000.

A ceramic yield of 64% is determined by thermogravimetric analysis.
The ceramic contains, by weight:
approximately 54.1% silicon;
approximately 29.9% nitrogen;
approximately 13.5% carbon; and
approximately 0.4% oxygen.

In Examples 4 to 6 the ratio of moles of water to moles of hydrazine is 0.35, 0.15 and 0 respectively, but the total of moles of water plus the moles of hydrazine remains constant and equal to 1. The sum of the number of moles of SiHCH$_3$Cl$_2$ and Si(CH$_3$)$_2$Cl$_2$ also remains constant and equal to 1.

EXAMPLE 4

The apparatus employed is the same as that used in Example 1. With the reactor cooled to 15° C., 600 ml of toluene, 0.65 mole of SiHCH$_3$Cl$_2$, 0.35 mole of Si(CH$_3$)$_2$Cl$_2$ and 2.4 moles of triethylamine are introduced. A mixture containing 0.74 mole of hydrazine and 0.26 mole of water is then added at a constant rate over 30 minutes with stirring.

The reactor temperature is then raised to 60° C. for 6 hours. 0.5 mole of pure ammonia is then passed through the slurry at a constant rate of 20 l/h.

The reactor temperature is then returned to 15° C. and the slurry is allowed to stand for 15 hours with gentle stirring. The precipitate is filtered off (215 g determined after drying) under nitrogen pressure and the solvent and the remaining reactants are evaporated off as described in Example 1. 54.5 g of a very fluid liquid are recovered.

On the infrared spectrum, the $\nu$Si-N and $\nu$Si-O bands overlap to give a single broad band from 950 to 1200 cm$^{-1}$ with a maximum at 1044 cm$^{-1}$. The $\nu$SiH band has its maximum at 2129 cm$^{-1}$.

A ceramic yield of 47% is determined by thermogravimetric analysis.
The ceramic contains, by weight:
approximately 52.5% silicon;
approximately 22.7% nitrogen;
approximately 15.1% carbon; and
approximately 9.2% oxygen.

This polysiloxazane has an average molecular mass of approximately 1000.

EXAMPLE 5

The procedure is followed exactly as described in Example 4 but with a mixture of 0.87 mole of hydrazine and of 0.13 mole of water. After evaporation, 56 g of polysiloxazane are recovered and 222 g of precipitate are weighed after drying.

On the infrared spectrum it is found that the $\nu$Si-N and $\nu$Si-O bands overlap into a single band from 950 to 1200 cm$^{-1}$ with a maximum at 1030 cm$^{-1}$. The $\nu$SiH band has its maximum at 2143 cm$^{-1}$.

A ceramic yield of 50.3% is determined by thermogravimetric analysis.
The ceramic contains, by weight:
approximately 53% silicon;
approximately 26.1% nitrogen;
approximately 14.8% carbon; and
approximately 6% oxygen.

This polysiloxazane has an average molecular mass of approximately 1000.

EXAMPLE 6 (Comparative)

The procedure is followed exactly as described in Example 4 but with 1 mole of hydrazine and in the absence of water. After evaporation, 54.5 g of polysilazane are recovered and 208 g of dry precipitate are weighed.

The infrared spectrum shows a fairly narrow $\nu$SiN band with a maximum at 994 cm$^{-1}$ and the absence of any $\nu$Si-O band. The $\nu$SiH band has its maximum at 2129 cm$^{-1}$.

A ceramic yield of 53.4% is determined by thermogravimetric analysis.
The ceramic contains, by weight:
approximately 53.7% silicon;
approximately 28.9% nitrogen;
approximately 14.6% carbon;
approximately 0.3% oxygen.

This polysilazane has an average molecular mass of approximately 1000.

In Examples 7 to 9 the ratio of moles of water to the number of moles of hydrazine is 1, 0.15 and 0 respectively, but the total number of moles of water plus the number of moles of hydrazine remains constant and equal to 1. One mole of CH$_3$Si(CH=CH$_2$)Cl$_2$ has been employed in these 3 examples.

EXAMPLE 7

The procedure is followed exactly as described in Example 4 but with 1 mole of SiCh$_3$(CH=CH$_2$)Cl$_2$, 1.2 moles of hydrazine hydrate N$_2$H$_4$.H$_2$O (that is, 0.6 mole of N$_2$H$_4$ and 0.6 mole of H$_2$O) and 3 moles of triethylamine. The hydrazine hydrate is added over 30 mins. into the chlorosilane/triethylamine/toluene mixture.

86 g of a very fluid liquid are finally recovered. This polysiloxazane gives a ceramic yield of 34%.

The ceramic contains, by weight:
approximately 40.3% silicon;
approximately 5% nitrogen;
approximately 32% carbon; and
approximately 20.4% oxygen.

EXAMPLE 8

The procedure is followed exactly as described in Example 7 but with a hydrazine/water mixture comprising 0.87 mole of hydrazine and 0.13 mole of water. 76.6 g of a fairly fluid oil are recovered. This polysiloxazane gives a ceramic yield of 60%.

The ceramic contains, by weight:
approximately 44.3% silicon;
approximately 19.1% nitrogen;
approximately 28.7% carbon; and
approximately 5.1% oxygen.

EXAMPLE 9

The procedure is followed exactly as described in Example 7 but with 1 mole of hydrazine and in the absence of water. 77.9 g of a viscous oil are recovered. This polysilazane gives a ceramic yield of 62%.

The ceramic contains, by weight:
approximately 45.1% silicon;
approximately 22% nitrogen;
approximately 30.5% carbon; and
approximately 0.6% oxygen.

We claim:

1. Polysiloxazane polymer compositions comprising:
(a) units selected from the group consisting of

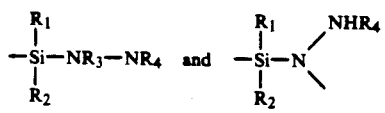  (I)

and mixtures thereof; and
(b) units of formula

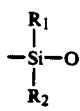  (II)

wherein $R_1$, $R_2$, $R_3$ and $R_4$, which may be identical or different is a radical selected from the group consisting of a hydrogen atom, a saturated aliphatic hydrocarbon radical, an alicyclic radical and mono- or polycyclic aryl, alkylaryl and arylalkyl radicals, wherein $R_1$ and $R_2$ do not simultaneously denote a hydrogen atom and wherein the molecular mass of said polysiloxazane is greater than 350.

2. The composition of claim 1 which further comprise units of formula:

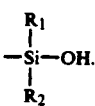

3. The compositions of claim 1 which further comprise units of formula:

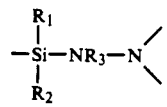  (IV)

4. The compositions of claim 2 further comprising units of formula:

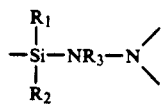  (V)

5. The compositions of claim 1, 2, 3 or 4 wherein the molecular weight thereof is between about 400 and 50,000.

6. The compositions of claim 5 wherein the molecular weight thereof is between about 400 and 10,000.

7. The composition of claims 1, 2, 3, or 4 wherein $R_1$, $R_2$, $R_3$ and $R_4$ denote a radical selected from the group consisting of:
   a. a hydrogen atom;
   b. saturated aliphatic hydrocarbon radicals containing from 1 to 8 carbon atoms;
   c. unsaturated radicals;
   d. alicyclic radicals containing from 3 to 7 carbon atoms; and
   e. radicals selected from the group consisting of phenyl, benzyl, phenylethyl, xylyl and naphtyl radicals.

8. The compositions of claim 7 wherein said saturated aliphatic hydrocarbon radicals are selected from the group consisting of methyl, ethyl, propyl, butyl, pentyl, hexyl, heptyl and octyl radicals and said unsaturated radicals are selected from the group consisting of vinyl and allyl radicals.

9. The composition of claim 7 wherein said alicyclic radicals are selected from the group consisting of cyclopropyl, cyclobutyl, cyclopentyl and cyclohexyl radicals.

10. A process for preparing polysiloxazane compositions which comprises reacting:
(a) at least one halosilane of formula

  (V)

(b) at least one hydrazine of formula:

(c) water
wherein $R_1$, $R_2$, $R_3$ and $R_4$, which may be identical or different is a radical selected from the group consisting of a hydrogen atom, a saturated aliphatic hydrocarbon, an unsaturated aliphatic hydrocarbon, an alicyclic radical and mono- or polycyclic aryl, alkylaryl and arylalkyl radicals; y is a halogen atom and (a+b) is an integer between 0 and 3 inclusive, wherein $R_1$ and $R_2$ do not simultaneously denote a hydrogen atom.

11. The process of claim 10 wherein said halogen atom is chlorine and wherein (a+b) is about 2.

12. The process of claim 10, wherein the halosilane is selected from the group consisting of $SiCl_4$, $(CH_3)_2SiCl_2$, $(CH_3)_3SiCl$, $CH_3SiCl_3$, $(C_6H_5)_2SiCl_2$, $(C_6H_5)(CH_3)SiCl_2$, $(C_6H_5)SiCl_3$, $(CH_3)(CH_3CH_2)SiCl_2$, $H_2SiCl_2$, $(CH_3)_2HSiCl$, $HSiCl_3$, $CH_3(CH_2=CH)SiCl_2$, $(CH_3)_2(CH_2=CH)SiCl$ and $(CH_3)HSiCl_2$ 13. The process of claim 10 or 12 wherein the hydrazine is selected from the group consisting of unsubstituted hydrazine, methylhydrazine, ethylhydrazine, phenylhydrazine, cyclo-hexylhydrazine, 1,2-dimethylhydrazine, 1,2-diethylhydrazine, 1,2-diphenylhydrazine, 1,2-dibenzylhydrazine, α-naphthylhydrazine, 1,2-diisopropylhydrazine, 1,2-ditolylhydrazines, 1,2-diisobutylhydrazine, (2,3-dimethylphenyl)hydrazine and 1,2-di(α-naphthyl)hydrazine.

14. The process of claim 10 or 12 wherein the total number of moles of water and of hydrazine is greater than the total number of moles of atoms of halogen added to the number of moles of silicon atoms.

15. The process of claim 13 wherein the total number of moles of water and hydrazine is greater than the total number of moles of atoms of halogen added to the number of moles of silicon atoms.

16. The process of claim 10 wherein the reaction is carried out in the presence of a tertiary amine.

17. The process of claim 16 wherein the tertiary amine is chosen from the group consisting of triethylamine, trimethylamine, triphenylamine and pyridine.

18. The process of claim 16 wherein the total number of moles of hydrazine and of water is greater than the number of moles of silicon atoms.

19. The process of claim 18 wherein 0.05 to 1 mole of water is employed per mole of hydrazine.

20. A shaped article comprising the polysiloxazanes of any one of claims 1, 2, 3 or 4 wherein said polysiloxazanes are in the form of at least one of fibers, filaments, powders, films, coverings, flakes, conduits, foams, woven articles, nonwoven articles and composite materials.

21. A ceramic article obtained by the pyrolysis at a temperature of at least about 700° C. of the polysiloxazane compositions obtained from the process of claim 10 wherein said compositions are in the form of at least one of fibers, filaments, powders, films, coverings, flakes, conduits, foams, woven or nonwoven articles and composite materials, and wherein said polysiloxazanes are prepared as recited in claim 10 and wherein said article comprises the following proportions of elements by weight:
silicon: 30–70%;
oxygen: 1–25%;
carbon: 0–35%; and
nitrogen: 2–30%.

* * * * *